(12) United States Patent
Li et al.

(10) Patent No.: US 11,948,570 B2
(45) Date of Patent: *Apr. 2, 2024

(54) KEY PHRASE SPOTTING

(71) Applicant: Google LLC, Mountain View, CA (US)

(72) Inventors: Wei Li, Mountain View, CA (US); Rohit Prakash Prabhavalkar, Santa Clara, CA (US); Kanury Kanishka Rao, Santa Clara, CA (US); Yanzhang He, Mountain View, CA (US); Ian C. Mcgraw, Menlo Park, CA (US); Anton Bakhtin, New York, NY (US)

(73) Assignee: Google LLC, Mountain View, CA (US)

( * ) Notice: Subject to any disclaimer, the term of this patent is extended or adjusted under 35 U.S.C. 154(b) by 7 days.

This patent is subject to a terminal disclaimer.

(21) Appl. No.: 17/654,195

(22) Filed: Mar. 9, 2022

(65) Prior Publication Data

US 2022/0199084 A1 Jun. 23, 2022

Related U.S. Application Data

(63) Continuation of application No. 16/527,487, filed on Jul. 31, 2019, now Pat. No. 11,295,739.
(Continued)

(51) Int. Cl.
*G10L 15/06* (2013.01)
*G10L 15/02* (2006.01)
(Continued)

(52) U.S. Cl.
CPC .............. *G10L 15/22* (2013.01); *G10L 15/02* (2013.01); *G10L 15/063* (2013.01); *G10L 15/18* (2013.01);
(Continued)

(58) Field of Classification Search
None
See application file for complete search history.

(56) References Cited

U.S. PATENT DOCUMENTS 10,032,463 B1 * 7/2018 Rastrow ................ G10L 15/183
10,229,672 B1 * 3/2019 Rao ........................ G10L 15/16
(Continued)

OTHER PUBLICATIONS

Shan C, Zhang J, Wang Y, Xie L. Attention-based end-to-end models for small-footprint keyword spotting. arXiv preprint arXiv: 1803.10916. Mar. 29, 2018. (Year: 2018).*
(Continued)

*Primary Examiner* — Seong-Ah A Shin
(74) *Attorney, Agent, or Firm* — Honigman LLP; Brett A. Krueger; Grant Griffith

(57) ABSTRACT

Methods, systems, and apparatus, including computer programs encoded on computer storage media, for detecting utterances of a key phrase in an audio signal. One of the methods includes receiving, by a key phrase spotting system, an audio signal encoding one or more utterances; while continuing to receive the audio signal, generating, by the key phrase spotting system, an attention output using an attention mechanism that is configured to compute the attention output based on a series of encodings generated by an encoder comprising one or more neural network layers; generating, by the key phrase spotting system and using attention output, output that indicates whether the audio signal likely encodes the key phrase; and providing, by the key phrase spotting system, the output that indicates whether the audio signal likely encodes the key phrase.

20 Claims, 3 Drawing Sheets

Related U.S. Application Data

(60) Provisional application No. 62/721,799, filed on Aug. 23, 2018.

(51) Int. Cl.
| | |
|---|---|
| *G10L 15/16* | (2006.01) |
| *G10L 15/18* | (2013.01) |
| *G10L 15/22* | (2006.01) |
| *G10L 19/00* | (2013.01) |
| G10L 15/08 | (2006.01) |
| G10L 15/14 | (2006.01) |

(52) U.S. Cl.
CPC ........ *G10L 19/00* (2013.01); *G10L 2015/025* (2013.01); *G10L 2015/088* (2013.01); *G10L 15/142* (2013.01); *G10L 2015/223* (2013.01)

(56) References Cited

U.S. PATENT DOCUMENTS

| | | | | |
|---|---|---|---|---|
| 10,387,776 | B2* | 8/2019 | Lin | G06N 3/08 |
| 10,490,195 | B1* | 11/2019 | Krishnamoorthy | G10L 17/22 |
| 10,770,066 | B2* | 9/2020 | Zhao | G06F 40/174 |
| 11,068,474 | B2* | 7/2021 | Ni | G06N 3/08 |
| 2009/0049354 | A1* | 2/2009 | Buckley, Jr. ... | G01R 31/318392 714/738 |
| 2014/0244285 | A1* | 8/2014 | Hinkle | G16H 50/20 705/2 |
| 2018/0330729 | A1* | 11/2018 | Golipour | G10L 15/26 |
| 2018/0341860 | A1* | 11/2018 | Shazeer | G06N 3/08 |
| 2019/0013015 | A1* | 1/2019 | Menendez-Pidal | G10L 15/144 |
| 2019/0130213 | A1* | 5/2019 | Shazeer | G06F 18/213 |
| 2019/0244603 | A1* | 8/2019 | Angkititrakul | G10L 15/1815 |
| 2019/0279614 | A1* | 9/2019 | Ye | G10L 15/187 |
| 2019/0318725 | A1* | 10/2019 | Le Roux | G10L 15/16 |
| 2019/0371307 | A1* | 12/2019 | Zhao | G10L 15/26 |
| 2021/0248376 | A1* | 8/2021 | Zhao | G06V 20/49 |

OTHER PUBLICATIONS

Prabhavalkar, Rohit, et al. "Automatic gain control and multi-style training for robust small-footprint keyword spotting with deep neural networks." 2015 IEEE International Conference on Acoustics, Speech and Signal Processing (ICASSP). IEEE, 2015. (Year: 2015).*

R. Prabhavalkar, R. Alvarez, C. Parada, P. Nakkiran and T. N. Sainath, "Automatic gain control and multi-style training for robust small-footprint keyword spotting with deep neural networks," 2015 IEEE International Conference on Acoustics, Speech and Signal Processing (ICASSP), 2015, pp. 4704-4708 (Year: 2016).

Hori, Takaaki, et al. "Advances in joint CTC-attention based end-to-end speech recognition with a deep CNN encoder and RNN-LM. " arXiv preprint arXiv:1706.02737 (2017). (Year: 2017).

S. Zhang, Wen Liu and Y. Qin, "Wake-up-word spotting using end-to-end deep neural network system," 2016 23rd International Conference on Pattern Recognition (ICPR), 2016, pp. 2878-2883 (Year: 2016).

Y Bai et al., "End-to-end keywords spotting based on connectionist temporal classification for Mandarin," 2016 10th International Symposium on Chinese Spoken Language Processing (ISCSLP), 2016, pp. 1-5 (Year: 2016).

Shan, Changhao, et al. "Attention-based end-to-end models for small-footprint keyword spotting." arXiv preprint arXiv:1803.10916 2018). (Year: 2018).

Abadi et al., "TensorFlow: Large-scale Machine Learning on Heterogeneous Distributed System," Google Brain, Nov. 9, 2015, 19 pages.

Alvarez et al., "On the efficient representation and execution of deep acoustic models," arXiv, Dec. 17, 2016, 5 pages.

Arik et al., "Convolutional recurrent neural networks for small-footprint keyword spotting," arXiv, Mar. 15, 2017, 5 pages.

Audhkhasi et al., End to End ASR-free keyword search from Speech, IEEE Xplore, Jan. 2017, 8 pages.

Bandanau et al., "End-to-end attention-based large vocabulary speech recognition," arXiv, Mar. 14, 2016, 8 pages.

Chan et al., "Listen, attend and spell: a neural network for large vocabulary conversational speech recognition," IEEE Xplore, 2016, 5 pages.

Chen et al, "A keyword-aware grammar framework for LVCSR-based spoken keyword search," IEEE Xplore, 2015, 5 pages.

Chen et al, "Query-by-example keyword spotting using long short-term memory networks," IEEE Xplore, Apr. 2015, 5 pages.

Chen et al, "Small footprint keyword spotting using deep neural networks," IEEE Xplore, May 2014, 5 pages.

Cortes et al, "Confidence intervals for the area under the ROC curve," NIPS, 2005, 8 pages.

Dean et al, "Large scale distributed deep networks," NIPS, 2012, 9 pages.

Fernandez et al, "An application of recurrent neural networks to discriminative keyword spotting," ICANN, 2007, 10 pages.

Fiscus et al, "Results of the 2006 spoken term detection evaluation," Semantic Scholar, 2006, 7 pages.

Graves et al, "Connectionist temporal classification: labeling unsegmented sequence data with recurrent neural networks," ICML, 2006, 8 pages.

Graves et al, "Sequence transduction with recurrent neural networks," arXiv, Nov. 14, 2012, 9 pages.

Graves et al, "Speech recognition with deep recurrent neural networks," arXiv, Mar. 22, 2013, 5 pages.

Greff et al, "LSTM: A search space odyssey," IEEE Xplore, Oct. 2017, 11 pages.

Hazen et al, "Query-by-example spoken term detection using phonetic posteriorgram templates," IEEE Xplore, Nov. 2009, 6 pages.

Hochreiter et al, "Long short-term memory," Neural Computation, 1997, 32 pages.

Keshet et al, "Discriminative keyword spotting," Elsevier, Sep. 20, 2016, 27 pages.

Li et al, "Acoustic modeling for google home," Interspeech, Aug. 2017, 5 pages.

Lu et al, "On training the recurrent neural network encoder-decoder for large vocabulary end-to-end speech recognition," IEEE Xplore, Mar. 2016, 5 pages.

McGraw et al, "Personalized speech recognition on mobile devices," arXiv, Mar. 11, 2016, 5 pages.

Miao et al, "EESEN: End to end speech recognition using deep RNN models and WFST-based decoding," arXiv, Oct. 18, 2015, 8 pages.

Miller et al, "Rapid and accurate spoken term detection," Interspeech, 2007, 4 pages.

Prabhavalkar et al., "A comparison of sequence-to-sequence models for speech recognition," Interspeech, Aug. 2017, 5 pages.

Prabhavalkar et al, "An analysis of 'attention' in sequence-to-sequence models," Interspeech, Aug. 2017, 5 pages.

Prabhavalkar et al, "Automatic gain control and multi-style training for robust small-footprint keyword spotting with deep neural networks," IEEE Xplore, Apr. 2015, 5 pages.

Prabhavalkar et al, "Discriminative articulatory models for spoken term detection in low-resource conversational setting," IEEE Xplore, May 2013, 5 pages.

Pmbhavalkar et al, "On the compression of recurrent neural networks with an application to LVCSR acoustic modeling for embedded speech recognition," arXiv, May 2, 2016, 5 pages.

Rosenberg et al, "End-to-end speech recognition and keyword search on low resource languages," IEEE Xplore, 2017, 5 pages.

Sainath et al, "Convolutional neural networks for small-footprint keyword spotting," Interspeech, 2015, 5 pages.

Sak et al, "Fast and accurate recurrent neural network acoustic models for speech recognition," arXiv, Jul. 24, 2015, 5 pages.

Sak et al, "Recurrent neural aligner: an encoder-decoder neural network model for sequence to sequence mapping," Interspeech, Aug. 2017, 5 pages.

(56) References Cited

OTHER PUBLICATIONS

Shannon et al, "Optimizing expected word error rate via sampling for speech recognition," arXiv, June 8. 2017, 5 pages.
Sun et al, "Max-pooling loss training of long short-term memory networks for small-footprint keyword spotting," arXiv, May 5, 2017, 7 pages.
Szoke et al, "Phoneme based acoustics keyword spotting in informal continuous speech," IEEE Xplore, 2005, 8 pages.
Tucker et al, "Model compression applied to small-footprint keyword spotting," Interspeech, Sep. 2016, 5 pages.
Vergyri et al, "The SRI/OGI 2006 spoken term detection system," Interspeech, 2007, 2004.
Wang et al, "Context dependent acoustic keyword spotting using deep neural network," IEEE Xplore, Oct. 2013, 10 pages.
Weintraub et al., "Keword-spotting using SRI's Decipher large-vocabulary speech-recognition system," IEEE Xplore, 5 pages.
Zhang et al, "White listing and score normalization for keyword spotting of noisy speech," Interspeech, 2012, 4 pages.
Zhuang et al, Unrestricted vocabulary keyword spotting using LSTM-CTC, Interspeech, Sep. 2016, 5 pages.
USPTO, Office Action for U.S. Appl. No. 16/527,487, dated Aug. 31, 2021.

\* cited by examiner

Attention matrix of a positive utterance for the keyword "sounds", with the transcript "sounds good".

Attention matrix of a negative utterance for the keyword "after-noon," with the transcript "you're welcome you know".

KEY PHRASE SPOTTING

CROSS-REFERENCE TO RELATED APPLICATION

This U.S. patent application is a continuation of, and claims priority under 35 U.S.C. § 120 from, U.S. patent application Ser. No. 16/527,487, filed on Jul. 31, 2019, which claims priority under 35 U.S.C. § 119(e) to U.S. Provisional Application 62/721,799, filed on Aug. 23, 2018. The disclosures of these prior applications are considered part of the disclosure of this application and are hereby incorporated by reference in their entireties.

BACKGROUND

Automatic speech recognition is one technology that is used in mobile devices among other types of devices. One task that is a common goal for this technology is to be able to use voice commands to wake up a device and have basic spoken interactions with the device. For example, it may be desirable for the device to recognize a "hotword" that signals that the device should activate when the device is in a sleep state.

SUMMARY

Some automatic speech recognition systems may use a key phrase spotting system to detect when a key phrase is encoded in an audio signal. For instance, a key phrase spotting system can analyze an audio signal to detect the occurrence of a key phrase, e.g., only a single key phrase or one of a limited set of key phrases. The key phrase can be specified by a user, an entity, such as a manufacturer or developer, or both.

The key phrase spotting system can be configured to only analyze the audio signal to determine whether or not the key phrase is present. The key phrase spotting system is different from a speech recognition system that is configured to recognize a much larger set of words in a language, e.g., most English words. Instead, the key phrase spotting system is designed to detect the predetermined key phrase, e.g., the combination of one or more words in the key phrase. For example, when the key phrase is "Okay Google." the key phrase spotting system may be configured to detect only that key phrase, so that the key phrase spotting system would not detect other phrases in an audio signal or potentially even individual words from the key phrase that are not the entire key phrase. In this example, the key phrase spotting system would not detect the phrases "Okay," "Google," "hey phone" or "hey automated assistant".

In addition, the output of a key phrase spotting system can be different from that of a speech recognizer. For example, the key phrase spotting system can be configured to evaluate incoming audio data on an ongoing or streaming basis, continually determining whether the predetermined key phrase has been uttered. Rather than output a transcription of words spoken or sounds detected, the key phrase spotting system can be configured to provide a signal upon detection of the predetermined key phrase. This signal can trigger one or more actions of a device, as discussed further below. Unlike a speech recognition system that would provide transcriptions of words and phrases, the key phrase spotting system can be configured so that audio of words and phrases different from the predetermined key phrase result in no output or the key phrase spotting system maintains an output indicating no occurrence of the predetermined key phrase.

The key phrase spotting system can include an attention-based biasing mechanism. As described in more detail below, the attention-based biasing mechanism can improve the key phrase spotting system's detection of key phrases. The attention-based biasing mechanism may include a key phrase encoder network, one or more attention layers, a prediction network, a joint network, or a combination of two or more of these.

The key phrase encoder network can enable the key phrase spotting system to detect different key words without retraining the key phrase spotting system. For instance, the key phase encoder system accepts, as input, data that represents a key phrase. This can enable the key phrase spotting system to initially detect a first key phrase, e.g., "Okay Google," and later detect a second, different key phrase, "Ian's phone," without retraining the key phrase spotting system (e.g., without re-training a neural network or other machine learning model).

The attention-based biasing mechanism, e.g., the one or more attention layers, can use output from the key phrase encoder network to determine a current context of the audio signal analysis with respect to the key phrase. For instance, if the analyzed portion of the audio signal does not include the key phrase, the context can indicate that the attention-based biasing mechanism has not identified a portion of the key phrase. If the analyzed portion of the audio signal likely includes a portion of a key phrase, the context can indicate a likely position within the key phrase that the analysis corresponds to. The likely position can be a numerical location of a sub-word unit, e.g., a grapheme, phoneme, or a hidden Markov model state, within a sequence of sub-word units that make up the key phrase. In some examples, the likely position can indicate the previously detected sub-word unit, the next sub-word unit, or both, in the key phrase. When the key phrase is "Okay Google," and the previously detected sub-word unit was part of "k," the context can indicate a numerical location for the appropriate sub-word unit that represents part of "k" or "ay," can indicate the appropriate sub-word unit that represents part of "k" or "ay," or some other appropriate data.

The attention-based biasing mechanism, e.g., the prediction network, can use the context information to bias the key phrase spotting system toward detection of the remaining part of the key phrase. For instance, when the previously detected sub-word unit was part of "k," the attention-based biasing mechanism can generate output that biases the key phrase spotting system to detection of a sub-word unit that is part of "ay" (or whatever the next sub-word unit would be). The key phrase spotting system can then use this biasing input from the attention-based biasing mechanism with a representation of a current frame of the audio signal to determine whether the current frame includes the next portion of the key phrase.

When the current frame does not include the next portion of the key phrase, the key phrase spotting system can continue to analyze later portions of the audio signal for the key phrase. For instance, the key phrase spotting system can analyze the next frame and determine whether the next frame encodes a sub-word unit for the beginning of the key phrase, e.g., "o."

When the current frame includes the next portion of the key phrase, the key phrase spotting system can continue the analysis until determining that the audio signal does or does not encode the key phrase. When the audio signal encodes the key phrase, the key phrase spotting system sends a signal to another system, such as an automatic speech recognition system. For example, the key phrase can be a hotword or wake word designated in advance as an audible signal indicating that the speech that follows the key phrase is a command to a device or digital conversational assistant. Upon detecting the key phrase, the key phrase spotting system can send a signal to an automatic speech recognition system that indicates that the automatic speech recognition system should capture and analyze the audio signal to detect the words that follow the key phrase.

The automatic speech recognition system can then cause a device to perform an action based on the detected words encoded in the audio signal. For instance, when the automatic speech recognition system detects "Okay Google, give me instructions to go to my parent's place" encoded in the audio signal, the automatic speech recognition system can provide data representing the detected words to an automated assistant, a map application, or both. The automated assistant or the map application can use the detected words to determine directions to the user's parents place, e.g., along with determining the parent's address using contact information.

In general, one innovative aspect of the subject matter described in this specification can be embodied in methods that include the actions of receiving, by a key phrase spotting system, an audio signal encoding one or more utterances; while continuing to receive the audio signal, generating, by the key phrase spotting system, an attention output using an attention mechanism that is configured to compute the attention output based on a series of encodings generated by an encoder that may include one or more neural network layers; generating, by the key phrase spotting system and using attention output, output that indicates whether the audio signal likely encodes the key phrase; and providing, by the key phrase spotting system, the output that indicates whether the audio signal likely encodes the key phrase.

In general, one innovative aspect of the subject matter described in this specification can be embodied in methods that include the actions of receiving, by a key phrase spotting system, an audio signal encoding one or more utterances; while continuing to receive the audio signal, determining, for each frame of multiple frames representing the audio signal, a predicted sub-word unit for a current frame by: generating, using an encoder network, an encoder output for the current frame; generating a context vector for the current frame that identifies a location in the multiple frames that likely corresponds to a portion of a key phrase using, as input to an attention layer included in the key phrase spotting system, data representing the key phrase and a state of the key phrase spotting system after predicting sub-word units for one or more of any frames in the multiple frames prior to the current frame in the audio signal; generating a predicted label for the current frame using, as input to a prediction network included in the key phrase spotting system, the context vector for the current frame and data representing a previously predicted sub-word for a previous frame; and generating a combined output for the current frame that represents the predicted sub-word unit using, as input to a joint network included in the key phrase spotting system, the encoder output for the current frame and the predicted label; and providing, by the key phrase spotting system, output that indicates whether the audio signal encodes the key phrase based on the combined output.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The attention mechanism may be an attention-based biasing mechanism a) included in the key phrase spotting system b) that biases key phrase detection toward a sequence of sub-word units corresponding to a key phrase. The method may include predicting sub-word units corresponding to the audio signal using the attention output. Generating the output that indicates whether the audio signal likely encodes the key phrase may include generating the output using the predicted sub-word units corresponding to the attention output.

In some implementations, predicting the sub-word units corresponding to the audio signal may include generating, using the attention-based biasing mechanism, a context vector using an encoding of the key phrase and a representation of a prior state of at least a portion of the key phrase spotting system; and predicting, using the attention-based biasing mechanism, the sub-word units corresponding to the audio signal. Predicting the sub-word units corresponding to the audio signal may include: determining, using the attention-based biasing mechanism and for a frame from multiple frames representing the audio signal, that a particular predicted sub-word unit for the frame is likely a sub-word unit for the key phrase; and in response to determining that the particular predicted sub-word unit for the frame is likely a sub-word unit for the key phrase, activating an attention layer in the attention-based biasing mechanism to cause the attention layer to generate the context vector for a current frame from the multiple frames.

In some implementations, determining, for the frame from the multiple frames, that the particular predicted sub-word unit for the frame is likely a sub-word unit for the key phrase may include determining, for the frame from the multiple frames, that the particular predicted sub-word unit for the frame is likely a first sub-word unit in the key phrase. The representation of the prior state of at least a portion of the key phrase spotting system may include a representation of a state, after processing data for one or more of any frames in the multiple frames prior to a current frame in the audio signal, of the attention layer and a prediction network that generates a predicted label using the context vector and a second representation of a prior state of at least a portion of the key phrase spotting system. Generating the context vector may include: for each frame of multiple frames representing the audio signal: generating the context vector for a current frame that represents a predicted sub-word unit for the key phrase using the encoding of the key phrase and a representation of the prior state of at least a portion of the key phrase spotting system after predicting sub-word units for one or more of any frames in the multiple frames prior to the current frame in the audio signal.

In some implementations, predicting the sub-word units corresponding to the audio signal may include: generating, by a prediction network included in the key phrase spotting system, a predicted label using the context vector and a second representation of a prior state of at least a portion of the key phrase spotting system. Generating the predicted label may include: for each frame of multiple frames representing the audio signal: generating, by the prediction network, the predicted label for a current frame from the multiple frames using the context vector for the current frame and data representing a previously predicted sub-word for a previous frame. Generating the predicted label for the current frame may include generating, for a first frame in the multiple frames that is located before the other frames in the audio signal, the predicted label for the current frame using, as input to the prediction network, the context vector for the current frame and a value that identifies the current frame as the first frame. The prediction network may include one or more recurrent neural network layers. The prediction network may include one or more long short-term memory layers.

In some implementations, the attention-based biasing mechanism may include one or more deep neural network layers. Generating the output that indicates whether the audio signal likely encodes the key phrase may include: generating, by a softmax layer included in the key phrase spotting system, a probability that the audio signal includes the predicted sub-word unit, and generating, by the key phrase spotting system and using the probability, the output that indicates whether the audio signal likely encodes the key phrase. Generating the probability that the audio signal includes the predicted sub-word unit may include generating a probability distribution over output labels for each of the sub-word units included in the key phrase. Predicting the sub-word units corresponding to the audio signal may include for each frame of multiple frames representing the audio signal: generating, by a prediction network included in the key phrase spotting system, a predicted label using a context vector for the current frame from the multiple frames and a previously predicted probability, generated by the softmax layer, that a previous frame in the multiple frames encodes a sub-word unit.

In some implementations, the method may include generating, by a keyword encoder included in the key phrase spotting system, data representing the key phrase. Predicting sub-word units corresponding to the audio signal may include predicting sub-word units corresponding to the audio signal using the attention output and the data representing the key phrase. The method may include, while continuing to receive the audio signal-receiving, by the key phrase spotting system, data that identifies a new key phrase that is a different key phrase from the key phrase; generating, by the keyword encoder included in the key phrase spotting system, updated data representing the new key phrase; and predicting, using the attention-based biasing mechanism that biases key phrase detection prediction toward a sequence of sub-word units corresponding to the new key phrase, sub-word units corresponding to the audio signal using data that represents the new key phrase.

In some implementations, the method may include, for each of multiple, different key phrases during a training process: generating, by a keyword encoder included in the key phrase spotting system, data representing the respective key phrase; and training the key phrase spotting system for the key phrase by adjusting one or more parameters in an encoder network that generates encoder output that represents an encoding of a current frame, the attention-based biasing mechanism. Predicting sub-word units corresponding to the audio signal may include predicting sub-word units corresponding to the audio signal using the attention output and the data representing the key phrase. Training the key phrase spotting for each of the multiple, different key phrases may include: training the key phrase spotting system only for key phrases in a set of key phrases that includes the multiple, different key phrases and does not include the key phrase. Each of the predicted sub-word units may include the same one of: a grapheme, a phoneme, or a hidden Markov model state.

In some implementations, the method may include, for each frame of multiple frames representing the audio signal: generating, by an encoder network included in the key phrase spotting system, an encoder output that represents an encoding of a current frame from the multiple frames, and generating, using the encoder output for the current frame and the predicted sub-word unit, a combined output for the current frame that represents a predicted sub-word unit. The encoder network may include one or more recurrent neural network layers. The encoder network may include one or more long short-term memory layers. The method may include generating, by a keyword encoder included in the key phrase spotting system, data representing the key phrase that is in a format that is similar to a format of the encoder output. Predicting sub-word units corresponding to the audio signal may include predicting sub-word units corresponding to the audio signal using the attention output and the data representing the key phrase. Providing the output that indicates whether the audio signal encodes the key phrase may include providing, to an automated speech recognition system, output that indicates that the audio signal encodes the key phrase to cause the automated speech recognition system to detect other words encoded in the audio signal.

In some implementations, the method may include generating, by a softmax layer included in the key phrase spotting system and using the combined output, a probability that the audio signal includes the predicted sub-word unit; and generating, by the key phrase spotting system and using the probability, the output that indicates whether the audio signal encodes the key phrase. Generating the probability that the audio signal includes the predicted sub-word unit may include generating a probability distribution over output labels for each of the sub-word units included in the key phrase. Generating the predicted label for the current frame may include generating the predicted label for the current frame using, as input to the prediction network, the context vector for the current frame and a previously predicted probability, generated by the softmax layer, that a previous frame in the multiple frames encodes a sub-word unit.

In some implementations, the method may include generating, by a keyword encoder included in the key phrase spotting system, the data representing the key phrase. The data representing the key phrase may have a format that is similar to, or the same as, a format of the encoder output. The method may include for each of multiple, different key phrases during a training process: generating, by a keyword encoder included in the key phrase spotting system, the data representing the respective key phrase; and training the key phrase spotting system for the key phrase by adjusting one or more parameters in the encoder network, the attention layer, the prediction network, or the joint network. The key phrase spotting system may initially be trained with a training set that includes multiple key phrases. Training the key phrase spotting system may include training the key phrase spotting system to detect the key phrase that is not included in the multiple key phrases of the training set. The predicted sub-word unit may be one of: a grapheme, a phoneme, or a hidden Markov model state. Providing the output that indicates whether the audio signal encodes the key phrase may include providing, to an automated speech recognition system, output that indicates that the audio signal encodes the key phrase to cause the automated speech recognition system to detect other words encoded in the audio signal.

In some implementations, determining the predicted sub-word unit for the current frame may include determining, by the key phrase spotting system and for a frame from the multiple frames, that a particular predicted sub-word unit for the frame is likely a sub-word unit for the key phrase; and in response to determining that the particular predicted sub-word unit for the frame is likely a sub-word unit for the key phrase, activating the attention layer to cause the attention layer to generate the context vector for the current frame. Determining, for the frame from the multiple frames, that the particular predicted sub-word unit for the frame is likely a sub-word unit for the key phrase may include determining, for the frame from the multiple frames, that the particular predicted sub-word unit for the frame is likely a first sub-word unit in the key phrase. The encoder network may include one or more recurrent neural network layers. The encoder network may include one or more long short-term memory layers. The prediction network may include one or more recurrent neural network layers. The prediction network may include one or more long short-term memory layers. The joint network may include one or more deep neural network layers. The state of the key phrase spotting system may include a state of the attention layer and the prediction network after processing data for one or more of any frames in the multiple frames prior to the current frame in the audio signal. Generating the predicted label for the current frame may include generating, for a first frame in the multiple frames that is located before the other frames in the audio signal, the predicted label for the current frame using, as input to the prediction network, the context vector for the current frame and a value that identifies the current frame as the first frame.

The subject matter described in this specification can be implemented in various embodiments and may result in one or more of the following advantages. In some implementations, the systems and methods described below can use subword unit prediction, e.g., phoneme or grapheme prediction, to improve key phrase detection, to enable system detection of user defined key phrases, or both. For example, the systems and methods described below may use phoneme subword units to improve phrase detection, enable detection of user defined key phrases, or both. The systems and methods described below may use a key phrase spotting system that is not trained for any particular key phrase but is able to detect any key phrase, e.g., using a key phrase encoder network. The use of a key phrase encoder network may enable the systems and methods described in this document to detect key phases that include words not used in a training set for a key phrase spotting system that includes the key phrase encoder network.

In some implementations, the methods and systems described in this document may enable or improve detection of key phrases, e.g., key phrases with words not included in a training set, using a key phrase encoder network, an attention layer, a prediction layer, a joint network, or a combination of two or more of these, e.g., as an attention-based biasing mechanism. The attention-based biasing mechanism may bias a key phrase spotting system towards a specific key phase of interest, e.g., to improve key phrase detection accuracy. The systems and methods described below may have a reduced false rejection rate for key phrases when using an "end-of-word" symbol.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
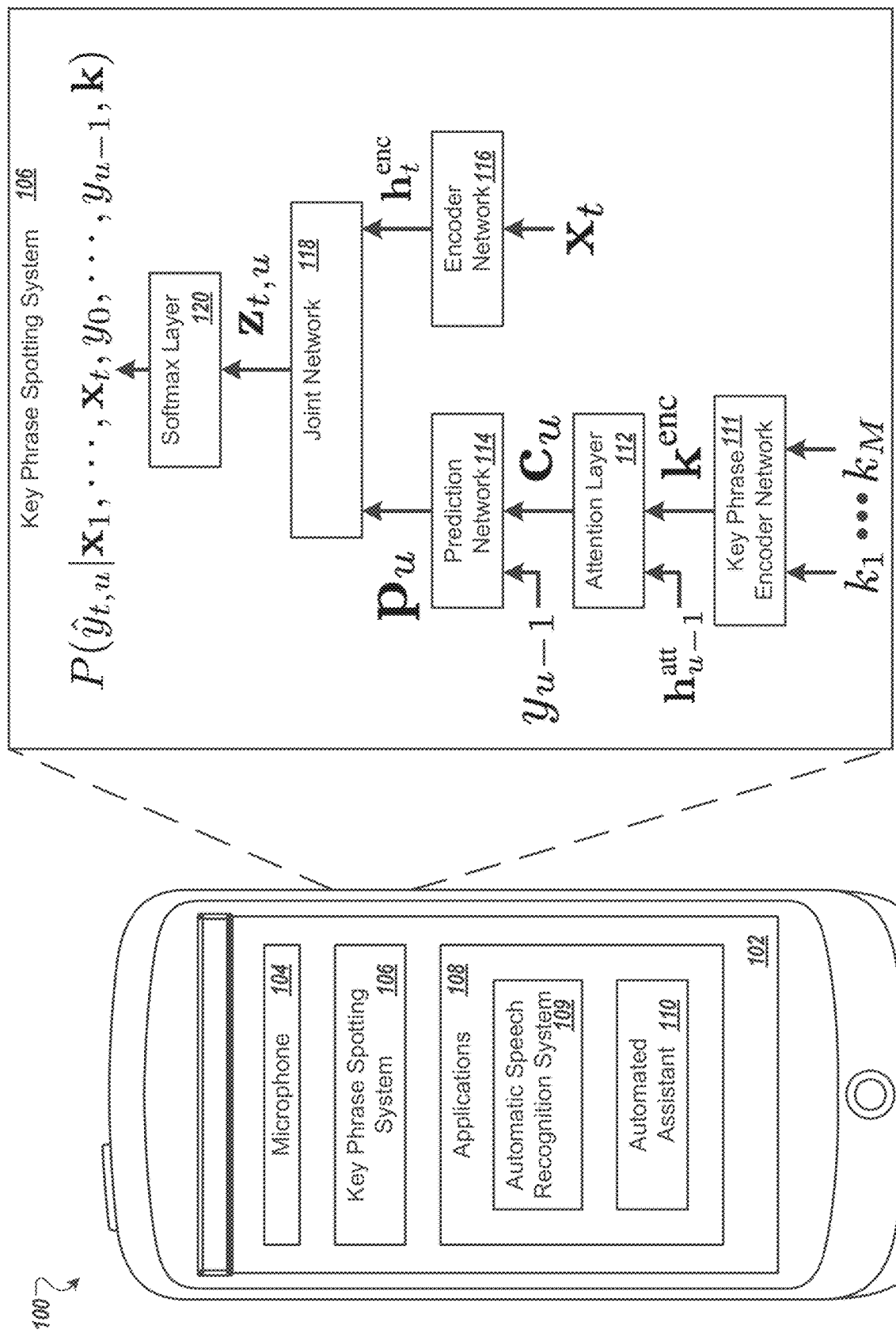
FIG. 1 depicts an example environment that includes a key phrase spotting system.

FIG. 1 depicts an example environment 100 that includes a key phrase spotting system 106. The environment 100 includes a device 102, such as a smart phone or a laptop computer. The device 102 includes a microphone 104. The microphone 104 receives audio signals, such as audio signals that encode speech spoken in the environment 100 or other sound. As used herein, a "key phrase" can include a single word or a phrase of multiple words.

In some implementations, the key phrase spotting system 106 uses a neural network to detect the presence of a predetermined key phrase. The neural network can be used to predict sub-word units corresponding to an audio signal, and the neural network can include an attention mechanism configured to bias prediction toward a sequence of sub-word units corresponding to the predetermined key phrase. Based on output of the neural network, the keyword spotting system can indicate whether the audio signal encodes the key phrase. In some cases, the attention mechanism computes attention over the encodings representing the key phrase. The attention mechanism can be configured to generate context vectors used to predict the sub-word units. The context vectors can each be generated by the attention mechanism based on an encoding of the predetermined key phrase and a representation of a prior state of at least a portion of the neural network.

The neural network can be configured such that the predetermined key phrase detected by the key phrase spotting system can be changed by changing a key phrase representation provided to the attention mechanism. For example, a key phrase encoder, which can be one or more neural network layers, can receive data indicating a key phrase, and can output one or more vectors as a key phrase representation that specifies the key phrase to the attention mechanism. In this manner, by changing the keyword encoding, the neural network can be directed to detect a different key phrase, without re-training the neural network. Further, the key phrase to be detected can be specified using text, without requiring any audio examples of utterances of the key phrase.

The device 102 can use the key phrase spotting system 106 to determine when to perform an action, such as responding to a user's query or waking from a sleep state. For instance, when the device 102 is a smart phone and is locked, the device 102 can use the key phrase spotting system 106 to analyze audio signals generated in the environment in which the device 102 is located. The audio signals may encode music (e.g., playing through a coffee shop stereo system), speech (e.g., a conversation between multiple people), or other audio content. Because the device 102 does not need to perform any actions in response to some audio signals, such as music, the device 102 can remain in a lower power state and use the key phrase spotting system 106 to determine when a key phrase, such as "Okay Google," is spoken and the device 102 should perform an action. When the device 102 detects the key phrase, the device 102 can wake up and switch to a higher power state, e.g., that uses more battery power and provides more functionality, like having the screen powered on, providing driving directions, responding to queries, etc.

The device 102 can use the key phrase spotting system 106 instead of an automatic speech recognition system 109 to detect the key phrase so that the device 102 conserves power while analyzing audio signals. For instance, the device 102 uses the key phrase spotting system 106 that has a smaller size, lower complexity, lower latency, or a combination of two or more of these, compared to an automatic speech recognition system 109.

Once the key phrase spotting system 106 detects an encoding of the key phrase in an audio signal, the device 102 may use an automatic speech recognition system 109 to determine an action to perform. For instance, when the key phrase spotting system 106 detects that "Okay Google" is encoded in an audio signal, the device 102 can use an automatic speech recognition system 109 to detect other speech encoded in the audio signal, e.g., "give me instructions to go to my parent's place." The device 102 may then trigger an appropriate action, such as providing driving directions to the user's parent's place using a map application, an automated assistant 110, or both.

The key phrase spotting system 106 can be a streaming key phrase system that can be deployed on mobile devices. As a streaming key phrase system, when deployed for inference, the key phrase spotting system 106 continuously processes incoming audio, and only triggers when a specific key phrase is uttered, e.g., detected in the audio stream. The mobile devices may be limited in terms of memory and computational capabilities, e.g., compared to desktop systems, systems with continuous or alternating current power sources, or both.

The key phrase spotting system 106 can use any appropriate structure, methods, or both, to detect key phrases. For instance, the key phrase spotting system 106 may have a recurrent neural network transducer (RNN-T) model. The RNN-T model may be an all-neural, end-to-end trained, sequence-to-sequence model. The RNN-T model can jointly learn acoustic and language model components.

The key phrase spotting system 106 may be trained to predict either phonemes, graphemes, or hidden Markov model states as subword units. This training may enable the key phrase spotting system 106 to detect arbitrary key phrases, e.g., any user defined key phrase. The training may enable the key phrase spotting system 106 to detect arbitrary key phrases without any words being off-limits as out-of-vocabulary words that cannot be detected, e.g., the training may enable the key phrase spotting system 106 to detect arbitrary key phrases that include words not in the recognition vocabulary. In other words, the training does not limit the key phrase spotting system 106 to a fixed, predetermined vocabulary, and so the key phrase spotting system 106 can be used to detect words and phrases that did not occur in the examples used for training. As discussed further below, the neural network training process for the key phrase spotting system 106 configures the system to detect whether an observed audio data matches the sequence of sub-word units indicated through key phrase encodings. The key phrase encodings can be changed or replaced to represent different key phrases, allowing a neural network model of the system to detect the new key phrases without re-training the neural network or other machine learning model of the key phrase spotting system 106.

The key phrase spotting system 106 can detect any appropriate key phrase, e.g., in the language for which the key phrase spotting system 106 was trained. For instance, the key phrase spotting system 106 can have an unrestricted vocabulary for the key phrase that the key phrase spotting system 106 will detect. In other words, the key phrase spotting system 106 can detect, during inference, a key phrase that includes any combination of words, is not known during model training, or both. For example, the key phrase spotting system 106 can receive, at any time, text representing a new key phrase. In response to receiving the text representing the new key phrase, the key phrase encoder network 111 can generate a new matrix $k^{enc}$ for the attention layer 112 to use as input when computing a context vector, as described in more detail below. This enables the key phrase spotting system 106 to change the key phrase for which the key phrase spotting system 106 analyzes audio signals during inference, e.g., without changing the structure or parameters (e.g., neural network weights) for the key phrase spotting system 106.

The key phrase spotting system 106 can be a streaming key phrase spotting system. For instance, the key phrase spotting system 106 may receive a stream of data from the microphone 104. The key phrase spotting system 106 may analyze the stream of data for a key phrase, e.g., one or more words, defined by a key phrase encoder network 111, included in the key phrase spotting system 106.

The key phrase spotting system 106 may include an attention-based biasing mechanism. The attention-based biasing mechanism may include the key phrase encoder network 111, one or more attention layers 112, a prediction network 114, or a combination of two or more of these. The attention-based biasing mechanism may enable the key phrase spotting system 106 to be aware of the key phrase of interest during a search process, e.g., for the key phrase when analyzing the stream of data received from the microphone 104. For example, during inference processing to detect keywords in audio, when the suffix of the current predicted label sequence is close to the prefix of the key phrase, or one of the words included in the key phrase, the attention-based biasing mechanism may activate the attention vector in the corresponding position within the key phrase. This may cause the key phrase spotting system 106, e.g., the attention layer 112, to generate a context vector to bias prediction towards the remaining part of the key phrase. Because a key phrase may only consist of a small number of targets, e.g., phonemes or graphemes or hidden Markov model states, the use of attention over the key phrase might not introduce any latency or significant computational overhead during inference by the key phrase spotting system 106.

The key phrase targets may be $k=[k_1; \ldots; k_M; k_{M+1}]$, where M is the number of targets in the key phrase. The combination of the key phrase targets, $k=[k_1; \ldots; k_M; k_{M+1}]$, represents the entire key phrase. For instance, $k_1$ represents a first sub-word unit in the key phrase, $k_2$ represents a second sub-word unit in the key phrase, and so on, $k_{M+1}$ may be a special target that corresponds to "not applicable", e.g., denoted <n/a>. The key phrase encoder network 111 can takes as input the subword sequence for the key phrase, e.g., $k_1; \ldots; k_M$. The key phrase encoder network 111 can output a matrix $k^{enc}=[k_1^{enc}; \ldots; k_M^{enc}; k_{M+1}^{enc}]$, where $k_i^{enc}$ is a one-hot embedding vector of $k_i$, and $k_{M+1}^{enc}$ is a zero vector.

By using the key phrase targets as input for the key phrase encoder network 11, the key phrase spotting system 106 can detect different key phrases without retraining or changing the weights of the key phrase spotting system 106. Instead, when a key phrase changes, the key phrase encoder network 111 receives new key phrase targets k, and generates a new matrix $k^{enc}$ for the new key phrase.

The key phrase spotting system 106 can determine the key phrase targets k from text representing the key phrase. For instance, the key phrase spotting system 106 determines the key phrase targets k from text representing the key phrase rather than audio examples of the key phrase.

In some implementations, the key phrase encoder network 111 generates the matrix $k^{enc}$ once during inference. For example, the key phrase encoder network 111 generates the matrix $k^{enc}$ when the key phrase spotting system 106 begins analyzing an audio signal. In these implementations, the key phrase encoder network 111 does not need to generate another matrix $k^{enc}$ unless the key phrase, for which the key phrase spotting system 106 analyzes audio signals, changes.

The attention layer 112 may compute a context vector $c_u$ for label u using dot-product $\beta_{j,u}$ over the key phrase targets, e.g., phoneme targets. For instance, the attention layer 112 may use Functions (1), (2), and (3), defined below, to compute the context vector $c_u$ for a label u. The context vector can be a weighted combination of data from encodings, for example, a weighted sum of the encoding vectors $k^{enc}$. In Function (1), $\phi(\bullet)$ and $\psi(\bullet)$ represent linear embeddings, and $\langle \bullet, \bullet \rangle$ represents the dot product between two vectors. In Function (1), the state of the attention-based biasing mechanism after predicting u−1 labels is represented as $h_{u-1}^{att}$. The attention layer 112 may be a "dot-product" attention layer. The attention layer 112 may be an "additive attention" layer.

$$\beta_{j,u} = \langle \phi(k_j^{enc}), \psi(h_{u-1}^{att}) \rangle \quad (1)$$

for each $1 \leq j \leq M+1$ $$\alpha_{j,u} = \frac{e^{\beta_{j,u}}}{\sum_{j'=1}^{M+1} e^{\beta_{j',u}}} \quad (2)$$

$$c_u = \sum_{j=1}^{M+1} \alpha_{j,u} k_j^{enc} \quad (3)$$

The attention layer 112 may receive the matrix $k^{enc}$ at any appropriate time. For instance, the attention layer 112 may receive the matrix $k^{enc}$ for a key phrase before the key phrase spotting system is used, e.g., the attention layer 112 receives a matrix $k^{enc}$ from the key phrase encoder network 111 once, for example during a configuration step prior to use in evaluating audio data input. In some examples, the attention layer 112 may receive a matrix $k^{enc}$ dynamically at the time the key phrase spotting system 106 is used to make a prediction. For example, the attention layer 112 may receive matrices $k^{enc}$ from the key phrase encoder network 111 for different key phrases at different times. For instance, the key phrase spotting system 106 may dynamically change the particular key phrase for which the key phrase spotting system 106 is searching by providing the attention layer 112 with a new matrix $k^{enc}$ during inference.

The prediction network 114 can receive a previous non-blank label, $y_{u-1}$ and a context vector, $c_u$, as input. The prediction network 114 may receive this input for each label u in the key phrase spotting system 106. The prediction network 114 may receive, as a non-blank label $y_{u-1}$ an output previously generated from the softmax layer. The output may be for a previous frame or another portion of an input audio signal. The prediction network 114 may receive, as a label for analysis of the first frame of an audio signal, a predetermined symbol, $y_0$=<sos>, e.g., which denotes the start of the sentence. The prediction network 114 can produce an output vector $p_u$ for the label u.

An encoder network 116, optionally included in the key phrase spotting system, receives a sequence of parameterized acoustic features as input. The sequence of parameterized acoustic features, e.g., for an audio signal, may be represented as $x=[x_1; \ldots; x_T]$, where, $x_i \in R^d$; and T represents the number of acoustic frames in the utterance. The encoder network 116 can map an input frame, $x_i$, into a higher-level representation, $h_t^{enc}$.

The key phrase spotting system can include a joint network 118. The joint network 118 receives input from the prediction network 114 and the encoder network 116 and computes output for each frame using respective outputs for that frame from the prediction network 114 and the encoder network 116. The joint network 118 may include a set of feed-forward layers. The joint network may compute a log it $z_{t,u}$ for each input frame t and label u. The joint network 118 may compute output using Functions (4) and (5) below.

$$h_{t,u}^{joint} = \tanh(Ah_t^{enc} + Bp_u + b) \quad (4)$$

$$z_{t,u} = Dh_{t,u}^{joint} + d \quad (5)$$

The joint network 118 may provide the computed output to a softmax layer 120 included in the key phrase spotting system 106. The softmax layer 120 can compute probabilities, e.g., a probability distribution $P(\hat{y}_t|x_1, \ldots, x_t)$, over targets in $\{\gamma \cup <b>\}$, where the output targets $\gamma$ are augmented with an additional symbol, referred to as the "blank" symbol, denoted as <b>. In the above, $\hat{y}=[\hat{y}_1, \ldots, \hat{y}_T] \in B(x, y)$, the set of all label sequences of length $|x|=T$, such that $\hat{y}_t \in (\gamma \cup <b>)$, for $1 \leq t \leq T$, which may be equivalent to y after first removing consecutive identical symbols, and then removing any blank symbols: e.g., xx<b><b>y<b>→xy. The sequence of output targets, e.g., graphemes or phonemes, corresponding to the utterance may be $y=[y_1; \ldots; y_L]$, where, $y_i \in Y$. In some examples, the input label sequence may be much longer than the target label sequence, e.g., T>L. In some examples, the softmax layer 120 may use Function (6), below, to compute the output $P(y|x)$. Function (6) may model the output probability of the target sequence, y, conditioned on the input, x.

$$P(y|x) = \sum_{\hat{y} \in B(x,y)} P(\hat{y}|x) = \sum_{\hat{y} \in B(x,y)} \prod_{t=1}^{T} P(\hat{y}_t|x_1, \ldots, x_t) \quad (6)$$

During training, the key phrase spotting system 106 may receive multiple training instances that each include an input sequence, x, an output sequence, y, and a keyword phrase, k. Some of the training instances may include input sequences x that represent an encoding of the key phrase k, and potentially other audio data. Some of the training instances may include input sequences x that do not represent an encoding of the key phrase k, e.g., and instead represent encodings of other words, background noise, or both. For input sequences x that represent an encoding of the key phrase, the output sequence y can include a predetermined symbol, e.g., <eokw>, after the occurrence of the key phrase.

For example, when training with phoneme targets, for the utterance "the cat sat," (which corresponds to the phoneme sequence [D V <eow> k {t <eow> s {t<eow>]), with a key phrase k=cat, then the key phrase spotting system 106 may receive output sequence y=[D V <eow> k {t <eow> <eokw> s {t <eow>], such that the <eow> token marks the end of each word token. Use of the <eokw> at the end of the key phrase in the output sequence y may improve training of the key phrase spotting system 106, e.g., may make the key phrase spotting system 106 more accurate.

During inference, the key phrase spotting system 106 may use the output of the softmax layer 120, P(y|x), to determine whether an audio signal, represented by the input sequence x, encoded the key phrase k. In some examples, the key phrase spotting system 106 can create an n-best list of hypotheses, W. The key phrase spotting system 106 may use the n-best list of hypotheses W to determine a confidence metric that indicates whether the audio signal encoded the key phrase k. The confidence metric may be a likelihood ratio of the keyword model to a background model. For instance, given an utterance x, the key phrase spotting system 106 may determine the highest probability hypothesis in W containing k P(w⁺|x). The key phrase spotting system 106 may determine, for the utterance x, the highest probability hypothesis in W which does not contain k P(w⁻|x). The key phrase spotting system 106 may set one or both of these probabilities to zero if no such corresponding hypothesis exists in the n-best list W. The key phrase spotting system 106 can compute a confidence metric C(x), e.g., in [0, 1], using Function (7) below.

$$C(x) = \frac{P(w^+ \mid x)}{P(w^+ \mid x) + P(w^- \mid x)} \quad (7)$$

In some examples, when all n-best entries in the n-best list W indicate that the utterance x encodes the key phrase k, the confidence score may be set to one. When none of the entries in the n-best list W indicates that the utterance encodes the key phrase k, the score may be set to zero.

The key phrase spotting system 106 may use other appropriate methods to determine whether an audio signal encodes an utterance of a key phrase. For instance, the key phrase spotting system 106 can use a "keywordfiller" model. The keywordfiller model can construct a decoder graph with two basic paths: the first is a path through the key phrase(s), and the second is a path through a filler (background) that models all non-key phrase speech. The key phrase spotting system 106 may include two decoders on separate graphs. This may effectively corresponds to using two beams during decoding: one for the filler model, and one for the key phrase paths. The key phrase spotting system 106 can use scores of the most likely paths from each these graphs to estimate P(w⁻|x) and P(w⁺|x), respectively, which can be used to generate a confidence score using Function (7).

In some examples, a filler model may be a phone loop. The phone loop might not include any paths from the filler model that contain the key phrase's phones, e.g., to cause any path containing the key phrase to pass through the key phrase model.

The filler model may include one or more constraints, e.g., to improve the accuracy of the filler model. For example, the phone loops may be unweighted word loops with word-level constraints. In some examples, the key phrase spotting system 106 can apply an n-gram phone language model, e.g., trained on automatically generated phonetic transcriptions of the same utterances that are used to train a word-level language model. The number of parameters in the phone language model may be trained to match the number of parameters of the word language model. The language model may be composed with both the filler and keyword graphs.

The key phrase spotting system 106 may use an end-of-word symbol to reduce false-positives, e.g., caused by a portion of a word's phonetic transcription matched that of a word included in the key phrase k. For example, the keyword Erica (E rn @k @) could be incorrectly detected in utterances containing the word, America (@ m E rn @ k @) and Marilyn (m E rn @ l @ n) could be incorrectly detected in utterances containing the word, Maryland (m E rn @ l @ n d). The key phrase spotting system 106 can receive, encoded in training data, a predetermined symbol, e.g., <eow>, at the end of each word's pronunciation. The key phrase spotting system 106 can use the predetermined symbol, with the beginning, end, or both, of an audio signal to determine whether the audio signal encodes a key phrase. For instance, the key phrase spotting system 106 can consider only key phrases in between two end-of-word symbols, or between a start-of-sentence marker and an end-of-word symbol, in the hypotheses. For instance, Erica would not be false triggered in the phrase: "In America," e.g., (I n <eow> @ m E r @ k <eow>), but will correctly trigger when the utterance contains "Call Erica," e.g., (k O l <eow> E rn @ k @ <eow>).

In some implementations, the input audio signal is represented with 80-dimensional log-mel filterbank energies, computed with a 25 ms window, and a 10 ms frame-shift. The key phrase spotting system 106, e.g., the encoder network 116, may receive, as input, three consecutive frames stacked together. In these implementations, the key phrase spotting system 106 may include an acoustic frontend that generates the input frames from the audio signal.

The key phrase spotting system 106 may include a plurality of long short-term memory ("LSTM") layers. For instance, the encoder network 116 may include 5 layers of 500 LSTM cells that predict context-independent phonemes as output targets. The key phrase spotting system 106 may include low-rank projection layers with 200 units between consecutive LSTM layers. The encoder network 116 can consist of 4.6 million parameters in total. The encoder network 116 can be first trained to optimize a connectionist temporal classification (CTC) objective function until convergence. Once CTC-training is complete, the encoder network 116 can be discriminatively sequence-trained to optimize expected word errors by minimizing word-level, edit-based, minimum Bayes risk.

The subword units may be any appropriate type of subword units. For instance, when the subword units are graphemes, the grapheme inventory may include the 26 lower-case letters (a-z), the numerals (0-9), a label representing 'space' (<space>), and punctuation symbols (e.g., the apostrophe symbol ('), hyphen (-), etc.).

The prediction network 114 may include a single layer of 500 LSTM cells. The LSTM cells may have coupled input and forget gate (CIFG). The joint network 118 may include a single feed-forward layer of 500 units. The joint network 118 may have a tanh activation function. A combination of the prediction network 114 and the joint network 118 may have 1.5 million parameters in total.

Output from the key phrase spotting system 106, e.g., P(y|x), can be decoded using a beam-search algorithm. For instance, the key phrase spotting system 106 may select at most 50 highest scoring candidates at every step during decoding. The key phrase spotting system 106 may smooth the output posteriors with a temperature τ, i.e. mapping each posterior to its t-th root and renormalizing them. This may improve key phrase spotting performance.

In some implementations, the key phrase spotting system 106, e.g., with phoneme targets, jointly trains an acoustic model component and a language model component in a single all-neural system. For instance, the encoder network 116 may correspond to an acoustic model component. The prediction network 114, the joint network 118, or both, may correspond to a language model component, e.g., a decoder network.

When the key phrase spotting system 106 determines that an audio signal encodes a key phrase, the key phrase spotting system 106, the device 102, or both, may perform an automated action in response. Specifically, the key phrase spotting system 106 does not generate or provide a transcription of the detected key phrase, but instead triggers an automated action in response. The action can be providing an output signaling that the predetermined key phrase has occurred.

For instance, the key phrase spotting system 106 may provide a message to an application 108 that is executing on the device 102 that indicates that the key phrase spotting system 106 detected the key phrase in an audio signal. The application 108 may be an automatic speech recognition system 109 that analyzes a larger portion of the audio signal, e.g., to determine whether the audio signal includes one or more words associated with the key phrase. The automatic speech recognition system 109 may generate a transcription of words encoded in the audio signal, which words may include the key phrase. The application 108 may be another appropriate type of application that performs an action automatically based on the key phrase. For instance, the application 108 may be a composition application, e.g., as part of an automated assistant 110, that creates an email or a text message using words encoded in the audio signal.

The device 102 may be any appropriate type of device. The device 102 may include personal computers, mobile communication devices, and other devices that can receive data from, or include, or both, the microphone 104.

In some examples, some components of the key phrase spotting system 106 can be implemented on different devices. For instance, the key phrase encoder network 111 can be implemented on a first device and the attention layer 112 and prediction network 114 can be implemented on a second, different device.

Other components that communicate with the key phrase spotting system 106 can be included on other devices. For example, the microphone 104 can be included in a first device while the key phrase spotting system 106 is implemented on a second, different device. In some implementations, the key phrase spotting system 106 can be implemented on a first device while an automatic speech recognition system 109, which is triggered by the key phrase spotting system 106 upon detection of a key phrase, can be implemented on a second, different device. The first device can be a user device. The second device can be a server or multiple computers that together form a server.

Figure 2A:
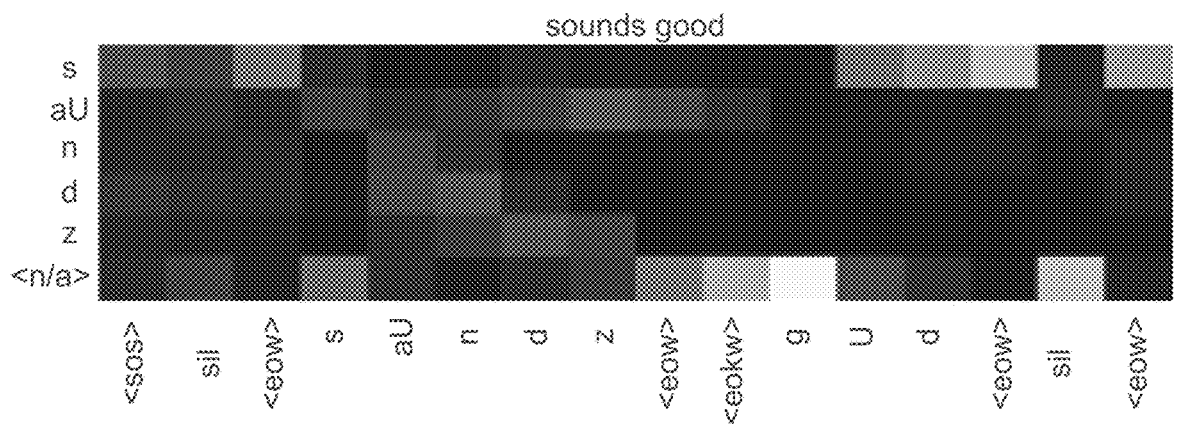
FIGS. 2A-B depict example attention matrices for two representative utterances.
Figure 2B:
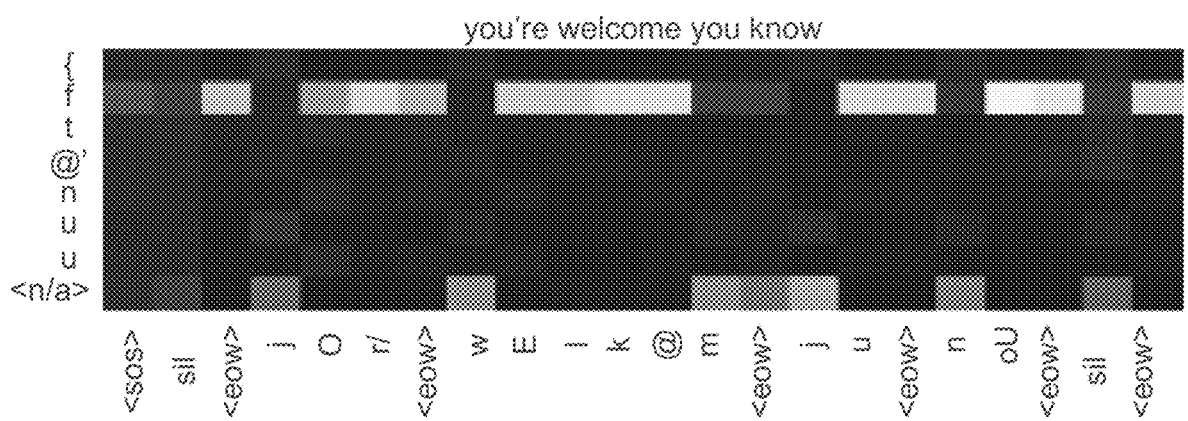

FIGS. 2A-2B depict example attention matrices 200a-b for two representative utterances. The y-axes correspond to targets $k_1; \ldots; k_{M+1}$ in the keyword k, e.g., "sounds." The x-axes correspond to the expected sequence of phoneme targets $p_u$ given the utterance transcript. The entry at row j and column it corresponds to $\alpha_{j,u}$ in Function (2), with values in each column summing up to 1. In FIGS. 2A-2B, brighter colors correspond to values closer to 1, while darker colors correspond to values closer to 0. FIGS. 2A-2B were generated by feeding as input the corresponding expected target label sequence, i.e., the labels are not determined by a beam-search decoding.

FIG. 2A depicts a positive attention matrix 200a based on a positive utterance that encodes the key phrase "sounds." For instance, the positive attention matrix 200a is based on the utterance of "sounds good." FIG. 2B depicts a negative attention matrix 200b based on a negative utterance that does not encode the key phrase "after-noon". For instance, the negative attention matrix 200b is based on the utterance of "you're welcome you know."

As shown in FIG. 2A, the attention weights in the positive attention matrix 200a are concentrated on the first word "sounds" in the utterance "sounds good." When a key phrase spotting system begins to predict the phonemes corresponding to the keyword (sounds (s aU n d z)), the attention weights in the positive attention matrix are focused on consecutive keyword targets, as shown by the diagonal pattern. Further, the attention weight assigned to the <n/a> label after the keyword has been detected is also associated with a high likelihood in the positive attention matrix 200a. In contrast, as shown in FIG. 2B, the negative attention matrix 200b does not evolve diagonally across the labels, but is instead spread across the negative attention matrix (e.g., the initial part of the hotword and the <n/a> label).

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry. e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback, and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HyperText Markup Language (HTML) page, to a user device, e.g., for purposes of displaying data to and receiving user input from a user interacting with the user device, which acts as a client. Data generated at the user device, e.g., a result of the user interaction, can be received from the user device at the server.

Figure 3:
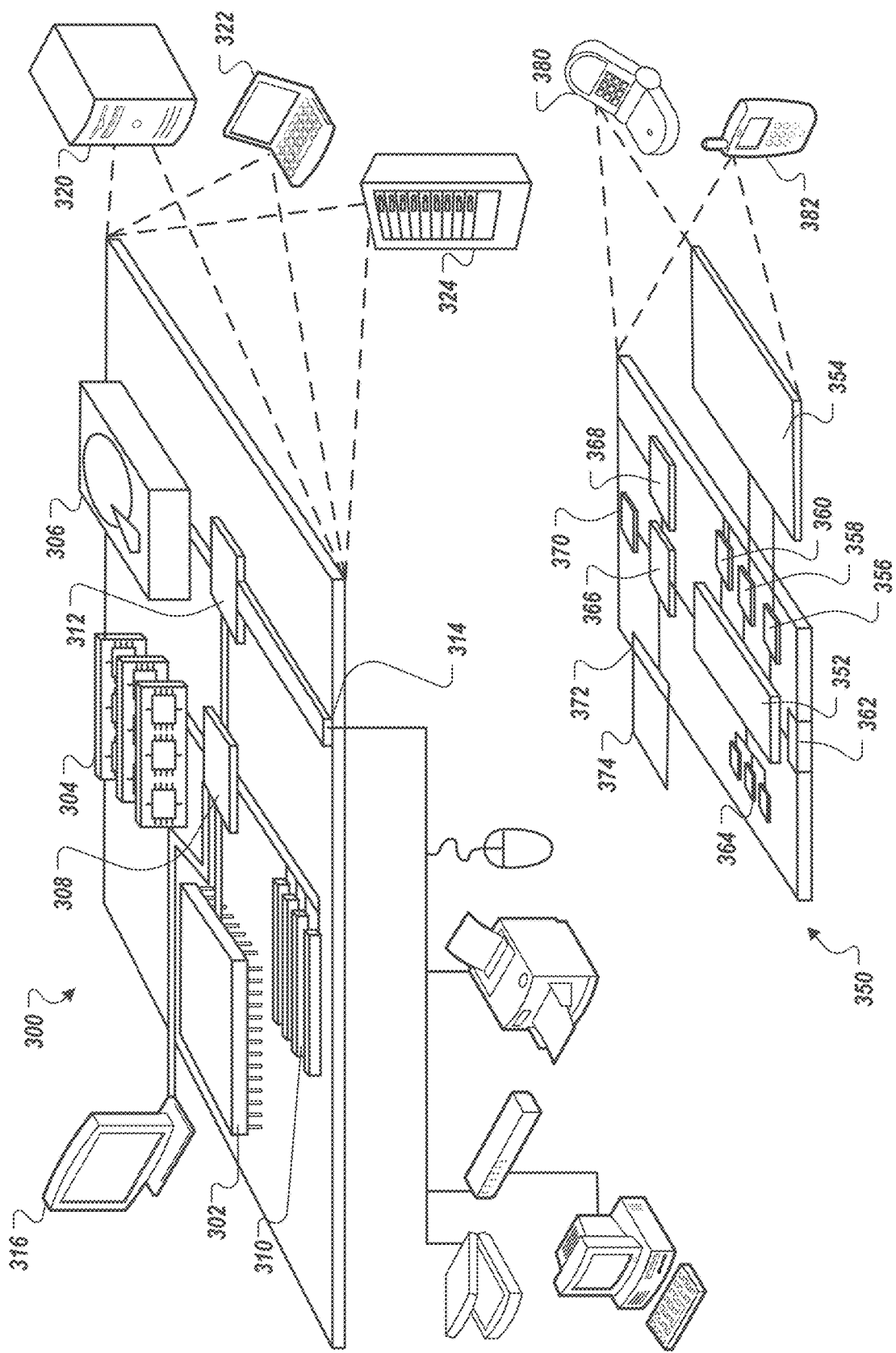
FIG. 3 is a block diagram of a computing system that can be used in connection with computer-implemented methods described in this document.

FIG. 3 is a block diagram of computing devices 300, 350 that may be used to implement the systems and methods described in this document, as either a client or as a server or plurality of servers. Computing device 300 is intended to represent various forms of digital computers, such as laptops, desktops, workstations, personal digital assistants, servers, blade servers, mainframes, and other appropriate computers. Computing device 350 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 300 includes a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as display 316 coupled to high speed interface 308. In other implementations, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system).

The memory 304 stores information within the computing device 300. In one implementation, the memory 304 is a computer-readable medium. In one implementation, the memory 304 is a volatile memory unit or units. In another implementation, the memory 304 is a non-volatile memory unit or units.

The storage device 306 is capable of providing mass storage for the computing device 300. In one implementation, the storage device 306 is a computer-readable medium. In various different implementations, the storage device 306 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 304, the storage device 306, or memory on processor 302.

The high speed controller 308 manages bandwidth-intensive operations for the computing device 300, while the low speed controller 312 manages lower bandwidth-intensive operations. Such allocation of duties is exemplary only. In one implementation, the high-speed controller 308 is coupled to memory 304, display 316 (e.g., through a graphics processor or accelerator), and to high-speed expansion ports 310, which may accept various expansion cards (not shown). In the implementation, low-speed controller 312 is coupled to storage device 306 and low-speed expansion port 314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as device 350. Each of such devices may contain one or more of computing device 300, 350, and an entire system may be made up of multiple computing devices 300, 350 communicating with each other.

Computing device 350 includes a processor 352, memory 364, an input/output device such as a display 354, a communication interface 366, and a transceiver 368, among other components. The device 350 may also be provided with a storage device, such as a microdrive or other device, to provide additional storage. Each of the components 350, 352, 364, 354, 366, and 368, are interconnected using various buses, and several of the components may be mounted on a common motherboard or in other manners as appropriate.

The processor 352 can process instructions for execution within the computing device 350, including instructions stored in the memory 364. The processor may also include separate analog and digital processors. The processor may provide, for example, for coordination of the other components of the device 350, such as control of user interfaces, applications run by device 350, and wireless communication by device 350.

Processor 352 may communicate with a user through control interface 358 and display interface 356 coupled to a display 354. The display 354 may be, for example, a TFT LCD display or an OLED display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may be provided in communication with processor 352, so as to enable near area communication of device 350 with other devices. External interface 362 may provide, for example, for wired communication (e.g., via a docking procedure) or for wireless communication (e.g., via Bluetooth or other such technologies).

The memory 364 stores information within the computing device 350. In one implementation, the memory 364 is a computer-readable medium. In one implementation, the memory 364 is a volatile memory unit or units. In another implementation, the memory 364 is a non-volatile memory unit or units. Expansion memory 374 may also be provided and connected to device 350 through expansion interface 372, which may include, for example, a SIMM card interface. Such expansion memory 374 may provide extra storage space for device 350, or may also store applications or other information for device 350. Specifically, expansion memory 374 may include instructions to carry out or supplement the processes described above, and may include secure information also. Thus, for example, expansion memory 374 may be provided as a security module for device 350, and may be programmed with instructions that permit secure use of device 350. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352.

Device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, WiFi, or other such transceiver (not shown). In addition, GPS receiver module 370 may provide additional wireless data to device 350, which may be used as appropriate by applications running on device 350.

Device 350 may also communicate audibly using audio codec 360, which may receive spoken information from a user and convert it to usable digital information. Audio codec 360 may likewise generate audible sound for a user, such as through a speaker, e.g., in a handset of device 350. Such sound may include sound from voice telephone calls, may include recorded sound (e.g., voice messages, music files, etc.) and may also include sound generated by applications operating on device 350.

The computing device 350 may be implemented in a number of different forms, as shown in the figure. For example, it may be implemented as a cellular telephone 380. It may also be implemented as part of a smartphone 382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method that when executed on data processing hardware causes the data processing hardware to perform operations comprising:
   receiving, as output from a key phrase encoder network, a key phrase encoding for a sequence of target sub-word units representing a key phrase;
   for each corresponding frame of multiple frames representing an incoming audio signal:
      processing, by an acoustic encoder network, the corresponding frame to generate an encoder output that represents an acoustic encoding of the corresponding frame;
      generating, using an attention mechanism, a context vector for the corresponding frame based on the key phrase encoding output from the key phrase encoder network;
      generating, using a prediction network that receives the context vector generated for the corresponding frame and a non-blank label previously output by a final softmax layer as input, an output vector for the corresponding frame; and
      predicting, using the output vector generated for the corresponding frame and the encoder output generated for the corresponding frame, a sub-word unit; and
   determining whether the incoming audio signal encodes an utterance of the key phrase based on the sub-word units predicted for the multiple frames.

2. The method of claim 1, wherein generating the context vector for the corresponding frame is further based on a representation of a prior state of the attention mechanism after processing data for one or more of any frames of the multiple frames that precede the corresponding frame.

3. The method of claim 1, wherein determining whether the incoming audio signal encodes an utterance of the key phrase based on the sub-word units predicted for the multiple frames comprises:
   generating, by a softmax layer, a probability that the incoming audio signal includes the sub-word units predicted for the multiple frames; and
   generating, using the probability, an output that indicates whether the incoming audio signal likely encodes the utterance of the key phrase.

4. The method of claim 1, wherein the predicted sub-word units comprise graphemes.

5. The method of claim 1, wherein the predicted sub-word units comprise phonemes.

6. The method of claim 1, wherein the predicted sub-word units comprise hidden Markov model states.

7. The method of claim 1, wherein each of the predicted sub-word units comprises the same one of a grapheme, a phoneme, or a hidden Markov model state.

8. The method of claim 1, wherein the operations further comprise, in response to determining that the incoming audio signal encodes the utterance of the key phrase, triggering an automatic speech recognition system to generate a transcription of other words following the key phrase that are encoded in the audio signal.

9. The method of claim 1, wherein, when the corresponding frame is located after an initial frame of the multiple frames representing the incoming audio signal, predicting the sub-word unit for the corresponding frame is further based on data representing a previously predicted sub-word for a previous frame of the multiple frames.

10. The method of claim 1, wherein the data processing hardware resides on a user device.

11. A system comprising:
data processing hardware; and
memory hardware storing instructions that when executed cause the data processing hardware to perform operations comprising:
receiving, as output from a key phrase encoder network, a key phrase encoding for a sequence of target sub-word units representing a key phrase;
for each corresponding frame of multiple frames representing an incoming audio signal:
processing, by an acoustic encoder network, the corresponding frame to generate an encoder output that represents an acoustic encoding of the corresponding frame;
generating, using an attention mechanism, a context vector for the corresponding frame based on the key phrase encoding output from the key phrase encoder network;
generating, using a prediction network that receives the context vector generated for the corresponding frame and a non-blank label previously output by a final softmax layer as input, an output vector for the corresponding frame; and
predicting, using the output vector generated for the corresponding frame and the encoder output generated for the corresponding frame, a sub-word unit; and
determining whether the incoming audio signal encodes an utterance of the key phrase based on the sub-word units predicted for the multiple frames.

12. The system claim 11, wherein generating the context vector for the corresponding frame is further based on a representation of a prior state of the attention mechanism after processing data for one or more of any frames of the multiple frames that precede the corresponding frame.

13. The system claim 11, wherein determining whether the incoming audio signal encodes an utterance of the key phrase based on the sub-word units predicted for the multiple frames comprises:
generating, by a softmax layer, a probability that the incoming audio signal includes the sub-word units predicted for the multiple frames; and
generating, using the probability, an output that indicates whether the incoming audio signal likely encodes the utterance of the key phrase.

14. The system claim 11, wherein the predicted sub-word units comprise graphemes.

15. The system claim 11, wherein the predicted sub-word units comprise phonemes.

16. The system claim 11, wherein the predicted sub-word units comprise hidden Markov model states.

17. The system of claim 11, wherein each of the predicted sub-word units comprises the same one of a grapheme, a phoneme, or a hidden Markov model state.

18. The system of claim 11, wherein the operations further comprise, in response to determining that the incoming audio signal encodes the utterance of the key phrase, triggering an automatic speech recognition system to generate a transcription of other words following the key phrase that are encoded in the audio signal.

19. The system of claim 11, wherein, when the corresponding frame is located after an initial frame of the multiple frames representing the incoming audio signal, predicting the sub-word unit for the corresponding frame is further based on data representing a previously predicted sub-word for a previous frame of the multiple frames.

20. The system of claim 11, wherein the data processing hardware and the memory hardware reside on a user device.

* * * * *